2 Sheets—Sheet 1.

G. N. PALMER,

Assignor to C. La Dow.

Combined Horse-Rake and Hay-Spreader.

No. 9,181. Reissued April 27, 1880.

WITNESSES

Wm A Skinkle

Wm T. Kilgore

Charles La Dow: ASSIGNEE OF INVENTOR

George N. Palmer:

By his Attorneys

Baldwin, Hopkins & Peyton

N. PETERS, PHOTO-LITHOGRAPHER, WASHINGTON, D. C.

2 Sheets—Sheet 2.

G. N. PALMER,

Assignor to C. La Dow.

Combined Horse-Rake and Hay-Spreader.

No. 9,181. Reissued April 27, 1880.

Charles La Dow ASSIGNEE OF
INVENTOR
George N. Palmer.

By his Attorneys
Baldwin, Hopkins & Peyton

WITNESSES
Wm A Skinkle
Wm T. Kilgrove

N. PETERS, PHOTO-LITHOGRAPHER, WASHINGTON, D. C.

UNITED STATES PATENT OFFICE.

GEORGE N. PALMER, OF GREENE, N. Y., ASSIGNOR TO CHARLES LA DOW.

COMBINED HORSE-RAKE AND HAY-SPREADER.

SPECIFICATION forming part of Reissued Letters Patent No. 9,181, dated April 27, 1880.

Original No. 51,473, dated December 12, 1865. Application for reissue filed December 9, 1879.

DIVISION B.

*To all whom it may concern:*

Be it known that I, GEORGE N. PALMER, of the town of Greene, in the county of Chenango and State of New York, have invented certain new and useful Improvements in a Combined Horse Hay-Rake and Tedding Machine, of which improvements the following is a full, clear, and exact description, reference being had to the accompanying drawings, making a part of this specification, and in which—

Figure 1:
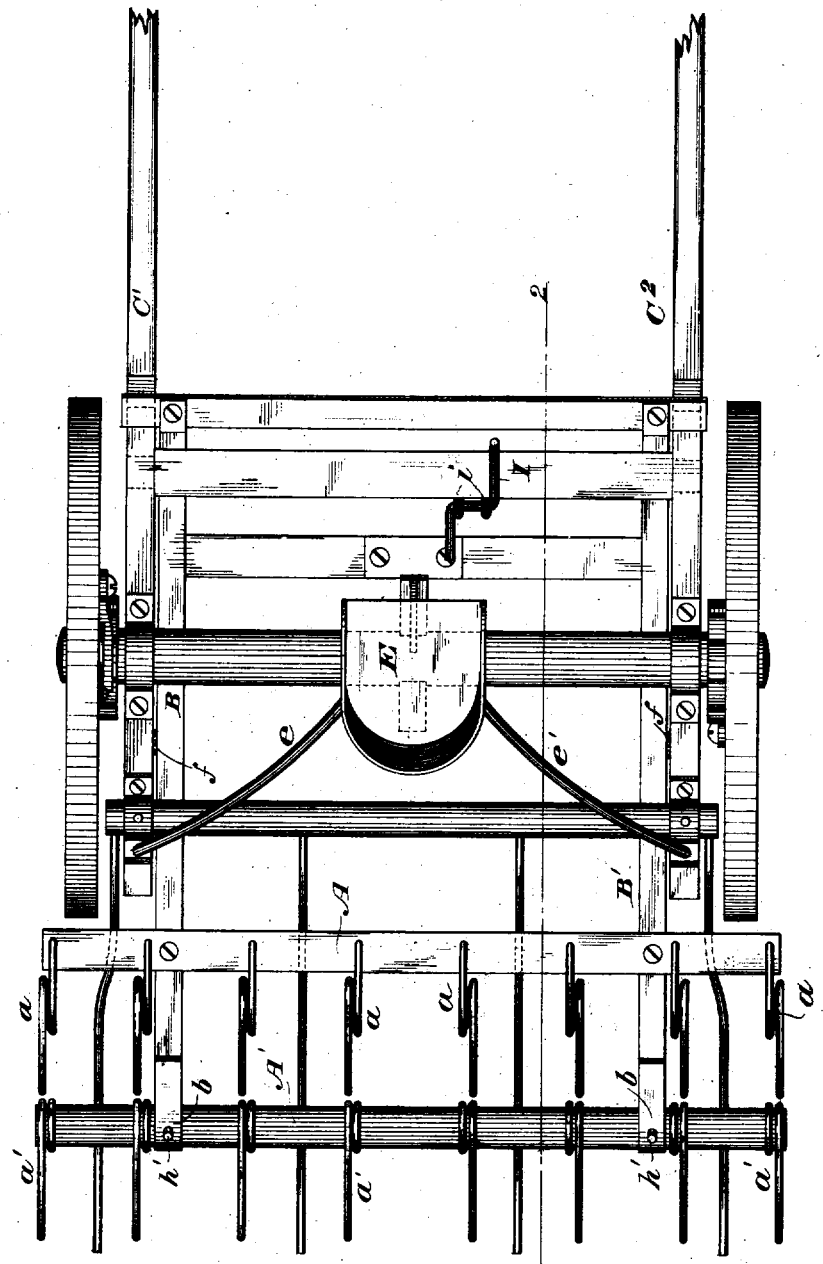
Figure 2:
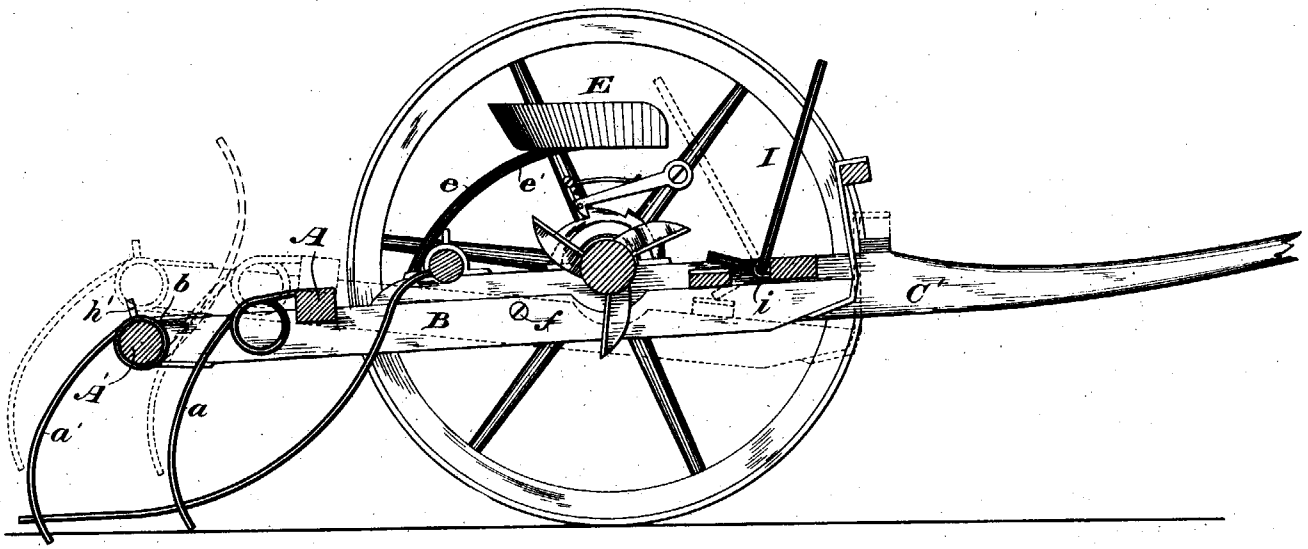

Figure 1 represents a plan or top view of a machine embodying all the improvements herein claimed. Fig. 2 represents a vertical longitudinal section therethrough on the line 2 2 of Fig. 1.

My invention relates to agricultural implements of the class which embody in their organization teeth which rake the surface over which they traverse.

The general object of my invention is to lighten manual labor and to facilitate the operations of this class of machinery by the use of power without multiplying the number of agricultural implements required to perform various operations or adding materially to the cost of first-class implements.

My invention, speaking generally, consists of a construction, arrangement, and combination of parts by which the implement may be used for stirring and turning over the substance operated upon with great facility in the most perfect manner.

The special object of the first part of my invention is thoroughly to rake, stir, and turn over the material operated upon, which end I attain by mounting upon a suitable supporting-frame gangs, sets, or ranks of spring-teeth extending transverely across the path of the machine in different vertical planes, so that both gangs act simultaneously upon the surface traversed.

A further object of this part of my invention is to counteract the jumping, jerks, and strains of a single gang of spring-teeth, which end I attain by attaching more than one gang, set, or rank on a frame, so that when a tooth in one gang yields to the strain of passing an obstruction such strain, and also the consequent recoil, will be compensated by the teeth in the other gang, all of which act simultaneously on the surface traversed.

The next part of my invention relates to the manner of securing the teeth upon the frame. Its object is to secure a strong, light, compact, and efficient organization of parts, which end I attain by mounting spring-teeth in gangs, sets, or ranks upon cross-bars secured to the frame in different vertical planes.

The object of the next part of my invention is to render one gang or set of spring-teeth adjustable relatively to the other and to the surface traversed, which ends I attain by mounting gangs, sets, or ranks of spring-teeth on a supporting-frame in different vertical planes, one of said sets, ranks, or gangs having the capacity of being adjusted to vary the angle of inclination of its teeth and of being locked in such adjusted position by suitable clamping mechanism.

The object of the next part of my invention is to raise or lower or adjust gangs, ranks, or sets of spring-teeth vertically at pleasure, which end I attain by mounting gangs, sets, or ranks of elastic, yielding, or spring teeth in different vertical planes transversely to the path of the machine on a supplementary frame vibrating on pivots on a main frame.

My invention further consists in combining a main frame, a supplementary frame vibrating on pivots thereon, a cross-bar on the rake-frame supporting a rank, set, or gang of spring-teeth, and another set, gang, or rank of spring-teeth mounted on a cross-bar or rock-shaft turning in bearings on the frame in a different vertical plane.

The object of the next part of my invention is to allow of the teeth being turned up out of the way when not in use, which end I attain by mounting them upon a reversible bar.

To enable those skilled in the art to make and use a machine embodying my improvements, I will now proceed to describe it more fully with reference to the accompanying drawings and letters of reference marked thereon.

In order to carry out the first part of my invention I mount gangs, sets, or ranks of spring-teeth *a a'* upon a supporting-frame, shown as consisting of two longitudinal beams or bars, B B', connected by suitable cross-bars, the teeth being arranged transversely to the path of the machine and in different vertical planes. The particular means for supporting the teeth in this position, (shown in the drawings,) and which constitutes the next part of my invention, consists in mounting these teeth on cross-bars A A′, secured to the longitudinal beams or bars B B′, above mentioned.

The front cross-bar, A, it will be observed, is mounted on the supporting-frame just outside the periphery of the driving-wheels, which arrangement enables a bar longer than the distance between the wheels to be used; hence the teeth will rake behind the wheels. Spring-teeth *a* are inserted in this bar a suitable distance apart, and inclined downward and backward, their length being such as to enable them, when the machine is in its normal condition of working, to drag over and scratch the surface over which they are drawn and gather up any substance lying thereon.

In order to carry out the next part of my invention, a bar, A′, is shown as capable of turning in suitable bearings *b* in the supporting-frame in rear of the fixed rake-head A, above mentioned, and as locked in any desired position by thumb-screws or pins *h′* of well-known construction.

The upper ends of the rake-teeth *a′* encircle the bar to which they are secured, which organization admits of the points of the teeth being adjusted at such an angle to the perpendicular or set of teeth in advance of it, as may be desired. This organization also gives to the teeth an additional capacity of being reversed or turned upward, so that the teeth will overbalance and be carried upon the supporting-frame out of the way, when desired, by revolving their shaft in its bearings.

In order to carry out the next part of my invention, the supporting or rake-carrying frame B is shown as composed of longitudinal bars or beams B B′, connected and braced to their front end by a cross-bar, and being connected with the main frame by pivots *f*, which permit the rake-frame to vibrate upon the main frame. This main frame is shown as consisting of thills or shafts C′ C², arranged at a suitable distance apart, parallel to each other, and connected by suitable cross bars or braces.

The wheels are shown as revolving loosely on an axle which revolves in suitable bearings in the main frame. Each wheel is connected to the axle by a suitable ratchet, which is held out of engagement when desired.

A seat, E, for the driver, is shown as located over the main axle and mounted on supporting standards or arms *e e′*, secured upon the main frame.

The front cross-bar of the rake-frame is arranged in front of the axle, and adapted for the reception of the draft-connection or whiffletrees for the attachment of the team.

It will be observed that by the organization shown the weight of the rocking frame preponderates to the rear of the pivot on which it rocks. The teeth, consequently, tend normally to bear constantly upon the ground.

To enable the driver to lift the teeth an elbow-lever, I, is shown as rocking in bearings *i* on the main frame, a toe on the short end of this lever being borne upon the cross-bar of the rocking frame. As this cross-bar is directly beneath the feet of the driver, it is obvious that his weight can be applied to effect or assist in effecting the same result.

The drawings show a cam for lifting the rake-teeth by the power of the team, a stop to limit the range of movement of the teeth, a reaction-spring for throwing down the teeth when lifted, and clearer-teeth for freeing the rake-teeth from obstructing matter as they rise.

These devices are not herein claimed, either by themselves or in combination with other features of the apparatus, as they constitute the subject-matter claimed in another division of this reissue. The claims of this present reissue are limited to an organization involving sets, gangs, or ranks of spring-teeth so arranged that all the ranks will act simultaneously on the surface traversed.

The operation of the apparatus will readily be understood from the foregoing description.

As the machine advances the teeth scratch, stir, and turn over the material over which they are drawn, the driver lifting them, whenever desired, by means of the lever or by bearing with his feet upon the front cross-bar of the rocking frame.

I am aware that rigid teeth arranged in transverse gangs, sets, or ranks are old in cultivators. I am also aware that a single rank, set, or gang of spring-teeth has heretofore been employed in horse-rakes; but, so far as I am aware, I am the first to organize gangs, sets, or ranks of spring-teeth in different vertical planes transversely to the path of the machine, so that the material is acted upon successively, first, by one set of teeth and then by the other, at one passage over the field, the advantage of which organization will be obvious to those skilled in the art; one of which advantages is that the vibrations of the teeth of one rank counteract those of the other, and thus prevent undue shaking, jumping, or vibration of the frame. I am also aware that elastic spring-teeth have been used in ranks in hay-tedders and revolved by means of gearing; but such organization does not come within the scope of my invention, which comprehends such arrangement of teeth as that they shall follow each other in ranks or gangs, each rank acting successively upon the same material at one passage over the field, the teeth being adapted to yield or spring rearwardly from the draft of the team without lifting the frame from the ground or clashing with each other.

Having thus fully described my invention, what I claim as new and useful, and desire to secure by Letters Patent, is—

1. The combination, substantially as herein-before set forth, of a supporting-frame and gangs, sets, or ranks of spring-teeth which operate simultaneously upon the surface traversed and extend transversely across the path of the machine in different vertical planes.

2. The combination, substantially as herein-before set forth, of a supporting-frame, cross-bars mounted thereon and extending transversely across the path of the machine in different vertical planes, and gangs, sets, or ranks of spring-teeth secured on the cross-bars, both gangs of teeth operating simultaneously on the surface traversed.

3. The combination, substantially as herein-before set forth, of a supporting-frame, gangs, sets, or ranks of spring-teeth mounted thereon transversely to the path of the machine, and mechanism for varying the angular relation of one set of teeth to the other.

4. The combination, substantially as herein-before set forth, of a supporting-frame, gangs, sets, or ranks of spring-teeth mounted thereon transversely to the path of the machine, and mechanism whereby one set of teeth can be adjusted relatively to the substance traversed.

5. The combination, substantially as herein-before set forth, of a supporting-frame, a cross-bar mounted thereon supporting a gang, set, or rank of spring-teeth, another cross-bar having the capacity of rocking in suitable bearings on the frame in a different vertical plane supporting another gang, set, or rank of spring-teeth, and clamping devices for locking this bar, with its teeth, at any desired angle relatively to the other bar.

6. The combination, substantially as herein-before set forth, of a main frame, a supplementary or rake frame, pivots connecting the two frames, and gangs, sets, or ranks of spring-teeth mounted on the supplementary frame in different vertical planes transversely to the path of the machine, each gang acting simultaneously on the surface traversed.

7. The combination, substantially as herein-before set forth, of a main frame, a supplementary frame, pivots connecting the two frames, a cross-bar on the rake-frame supporting a gang, set, or rank of spring-teeth, another cross-bar or rock-shaft turning in bearings on the frame in a different vertical plane, and also carrying a gang, set, or rank of spring-
55 teeth, both gangs acting simultaneously on the surface traversed.

8. The rock-shaft or cross-bar A′, having teeth mounted thereon, and having the capacity of being turned or reversed, so that the
60 teeth will overbalance and be carried upon the frame, as set forth.

GEO. N. PALMER.

Witnesses:
H. V. RANSOM,
MICHAEL MCINEREY.